Feb. 19, 1924.
C. S. ASH
1,483,863
WHEEL HUB
Original Filed Aug. 10, 1918
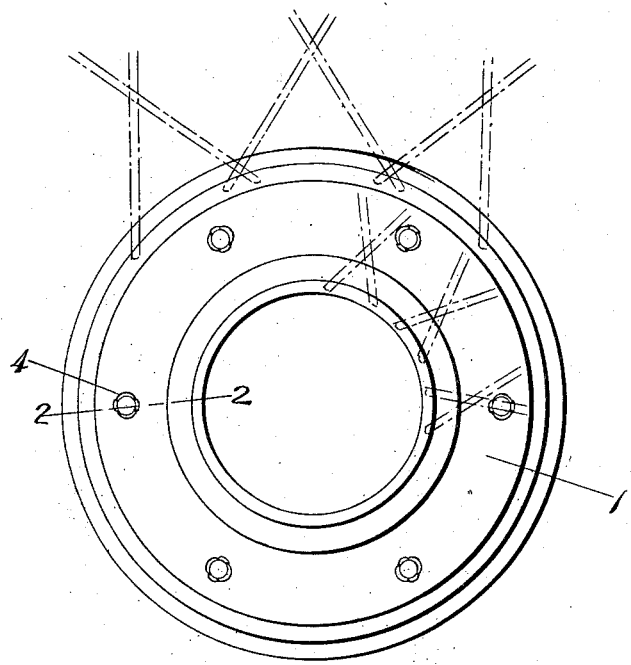
Fig. 1.
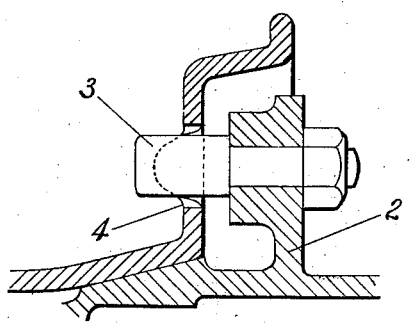
Fig. 2.
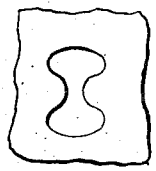 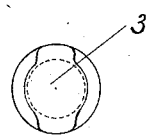
Fig. 3. Fig. 5.
 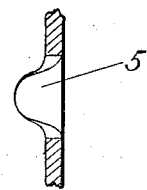
Fig. 4. Fig. 6.
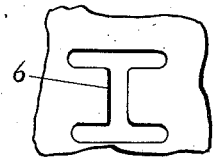 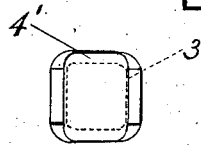
Fig. 7. Fig. 8.
INVENTOR
C. S. Ash
BY
Dull, Warfield & Dull
ATTORNEY Patented Feb. 19, 1924.

1,483,863

UNITED STATES PATENT OFFICE.

CHARLES S. ASH, OF DETROIT, MICHIGAN.

WHEEL HUB.

Application filed August 10, 1918, Serial No 249,274. Renewed June 8, 1923.

*To all whom it may concern:*

Be it known that I, CHARLES S. ASH, a citizen of the United States, residing at Detroit, in the county of Wayne and State of Michigan, have invented certain new and useful Improvements in Wheel Hubs, of which the following is a full, clear, and exact description, such as will enable others skilled in the art to which it appertains to make and use the same.

This invention relates more particularly to vehicle wheels of the quick-detachable type in which an outer hub, connected to the tire-carrying rim, removably fits over an inner hub and interlocks with the latter for transmission of the rotary driving and braking forces. The invention is especially directed to an improved construction of interengaging parts for the purpose mentioned and to an improved method of manufacture.

One of the objects of the invention is to provide an improved and strengthened socket on one hub to receive a complementary part on the other for insuring a wear-resisting interlock therebetween to prevent relative rotation, for permitting expeditious assembly of the hubs, and for insuring permanent concentricity of the latter in use.

Certain of the other objects and advantages will be noted hereinafter in connection with the following description of the accompanying drawing, which illustrates a typical embodiment of the invention and in which—

Figure 1 is an end elevational view of a quick-detachable wheel hub in mounted position;

Fig. 2 is an enlarged fragmentary view on the line 2—2 of Fig. 1;

Fig. 3 is an elevational fragmentary view of the outer hub showing a preferred form of punched aperture, in the first step of manufacture;

Fig. 4 is a central sectional view thereof;

Fig. 5 is a side view showing the finished form of aperture, with a driving lug indicated in dotted lines;

Fig. 6 is a central sectional view thereof;

Fig. 7 is a side view of a modified form of aperture, in the first step of manufacture; and Fig. 8 is a side view thereof in a succeeding step of manufacture, with a modified form of driving lug indicated in dotted lines.

Referring more particularly to the drawing, the wheel comprises a sheet metal outer hub 1 connected by spokes or otherwise to a tire-carrying rim and adapted for assembly on an inner driving hub 2, the latter being suitably arranged on the vehicle axle. To permit axial assembly of the hubs and effect their interengagement to prevent relative rotation, the inner hub 2 is preferably provided with a plurality of circumferentially spaced lugs 3, and hub 1 is provided with a corresponding number of complementary apertures or sockets 4 to receive said lugs. It will be apparent that when the outer hub is mounted axially on the inner hub, lugs 3 will enter and project through apertures 4 and thereby insure transmission of driving and braking forces to the wheel. The hubs are locked in axial assembly by a suitable cap nut, of any well known form.

Heretofore it has been common to provide the apertures 4 by merely punching through circular or elliptical holes in the hub metal. In the present construction, however, the hub is initially punched to provide an aperture of a dimension radial to the hub greater than the corresponding dimension of the driving lug to be received therein and of a width less than the dimension of such lug. A preferred form of the aperture is shown in Fig. 3. In the second step of manufacture the metal comprising the contracted side walls of the aperture is drawn or bent at substantially right angles to the body metal, either outwardly or inwardly, to provide an enlarged smooth wall 5 against which the sides of the driving lugs bear when the parts are assembled. Figs. 5 and 6 of the drawing indicate clearly the manner in which the side walls of the apertures are outturned, and it will be further apparent therefrom that the segmental bearing surfaces 5 afford a strongly re-enforced seat. Due to this construction relative wear or mutilation of the parts is substantially eliminated.

In the modified construction shown in Figs. 7 and 8 a substantially square driving lug 3' is employed and the outer hub socketed to receive the same by a punched aperture 4' substantially horizontal H-shaped. The side walls 6 of the latter are then subsequently drawn inward or outward to constitute flat abutment surfaces of substantial area against which the driving and braking forces from the lugs 3' are transmitted. By this construction the side bearing walls of the apertures are further increased in area, and the clearance between the driving lug and aperture walls in a direction radial of the hubs necessitates a driving pin alignment in substantially only one direction. That is to say, slight variations of the driving lugs in radial distance from the inner hub axis are automatically accommodated on account of the rectangular shape of the receiving sockets in the outer hub.

It will thus be seen that, by the construction described, a simple and improved interlock between the inner and outer hubs is provided, and further that the method of manufacture is expeditious and inexpensive.

Having described my invention, what I claim as new and desire to secure by Letters Patent is:

1. A sheet metal wheel hub provided with lug apertures having the metal at the sides of said apertures turned at substantially right angles to the body providing enlarged flat bearing surfaces adapted to take up the driving and braking strains from the lug.

2. A wheel hub provided with circumferentially spaced recesses for receiving complementary driving lugs, said recesses having a dimension radial to the hub greater than the corresponding dimension of the lugs and having integral outturned side walls providing flat bearing surfaces to fit snugly about the sides of the lugs.

3. In a wheel, in combination, a hub provided with circumferentially spaced substantially rectangular apertures, the metal at two opposite sides of said apertures being turned outward to provide flat bearing surfaces, and a member to receive said hub having complementary driving lugs to enter said apertures, said driving lugs being of a dimension to fit snugly between the outturned side walls of said apertures and to clear the sides of said apertures radial of said hub.

In testimony whereof I affix my signature, in the presence of two witnesses.

CHARLES S. ASH.

Witnesses:
J. R. WATSON,
H. E. VAN HORN.